United States Patent
Huckstepp

[11] Patent Number: 5,740,360
[45] Date of Patent: Apr. 14, 1998

[54] APPARATUS AND METHOD FOR RESETTING A MICROPROCESSOR IN THE EVENT OF IMPROPER PROGRAM EXECUTION

[75] Inventor: Stephen Arthur Huckstepp, Riverdene, England

[73] Assignee: Sony Corporation, Tokyo, Japan

[21] Appl. No.: 659,683

[22] Filed: Feb. 25, 1991

[30] Foreign Application Priority Data

Mar. 8, 1990 [GB] United Kingdom .................. 9005250

[51] Int. Cl.$^6$ ................................................ G06F 11/28
[52] U.S. Cl. ................ 395/185.03; 371/62; 395/183.15; 395/185.08
[58] Field of Search .................. 371/12, 16.3, 25.1, 371/60, 62, 19; 395/550, 575, 183.15, 185.03, 185.08

[56] References Cited

U.S. PATENT DOCUMENTS

| | | | |
|---|---|---|---|
| 3,713,095 | 1/1973 | McPherson | 395/185.03 |
| 4,108,359 | 8/1978 | Proto | 371/22.4 |
| 4,594,685 | 6/1986 | Owens | 395/182.21 |
| 4,683,532 | 7/1987 | Yount et al. | 380/4 |
| 4,727,549 | 2/1988 | Tulpule et al. | 395/185.08 |
| 4,752,930 | 6/1988 | Kitamura et al. | 371/62 |
| 4,763,296 | 8/1988 | Gercekci | 395/185.08 |
| 4,809,280 | 2/1989 | Shouaka | 395/185.08 |
| 4,879,647 | 11/1989 | Yazawa | 395/185.08 |
| 4,956,807 | 9/1990 | Hosaka et al. | 395/185.08 |
| 5,073,853 | 12/1991 | Johnson | 395/182.21 |

FOREIGN PATENT DOCUMENTS

| | | |
|---|---|---|
| 0 266 836 | 5/1988 | European Pat. Off. . |
| 2177241 | 1/1987 | United Kingdom . |

Primary Examiner—Kenneth S. Kim
Attorney, Agent, or Firm—Frommer Lawrence & Haug LLP; William S. Frommer

[57] ABSTRACT

A microprocessor arrangement includes a microprocessor that executes a program which includes a plurality of watchdog instructions which are located in respective different portions of the program and all of which should be executed during execution of the program. An address bus receives addresses generated during execution of the program. An address decoder is responsive to receipt of a watchdog instruction from the address bus to activate one of a number of output lines thereof. The watchdog instructions are different from one another whereby, if the microprocessor is operating correctly, the output lines will be activated in a predetermined sequence. A watchdog circuit is responsive to the output lines being activated in other than the predetermined sequence to reset the microprocessor via a reset input.

10 Claims, 2 Drawing Sheets

APPARATUS AND METHOD FOR RESETTING A MICROPROCESSOR IN THE EVENT OF IMPROPER PROGRAM EXECUTION

BACKGROUND OF THE INVENTION

1. Field of the Invention

This invention relates to supervision of the operation of microprocessors.

2. Description of the Prior Art

Systems incorporating microprocessors often are provided with circuits for supervising or monitoring the operation of the microprocessor and resetting it in the event of a fault being detected. Such circuits are commonly referred to as watchdog circuits. A known watchdog circuit comprises a timer circuit, in the form of a counter or retriggerable monostable circuit, which resets the microprocessor if the timer circuit has not been reset after a predetermined period of time has elapsed. A watchdog instruction, which acts as a command to reset the timer circuit, is embedded in a program run by the microprocessor. The reset command is executed periodically such that, if the microprocessor is operating correctly, the timer circuit is always reset before the predetermined period of time has elapsed whereby the timer circuit does not reset the microprocessor. If, on the other hand, a fault occurs, the timer circuit is not reset whereby the microprocessor is reset.

Whereas the known watchdog circuit will operate correctly if the program loaded in the microprocessor stops being executed, or if a portion of the program containing the watchdog instruction (timer circuit reset command) is not executed, it is subject to the disadvantage that there are some commonly-occurring faults which it will not recognise. Specifically, it will not recognise faulty operation (and correct for it by resetting the microprocessor) resulting from the sequence of operation of different parts of the program being corrupted or from portions of the program other than that containing the watchdog instruction not being executed, both of which types of faulty operation can occur if, for example, the stack of the microprocessor (which holds the addresses of sub-routines) is corrupted.

An object of the invention is to provide a microprocessor arrangement which is free from the above-mentioned disadvantage.

Another object of the invention is to provide a method of operating a microprocessor arrangement which enables the above disadvantage to be avoided.

SUMMARY OF THE INVENTION

The present invention provides a microprocessor arrangement which includes a microprocessor that executes a program which includes a number of watchdog instructions which are different from one another and all of which should be executed during execution of the program, and supervisory means connected to the microprocessor and responsive to the watchdog instructions being executed other than in a predetermined order to reset the microprocessor.

Such an arrangement will ensure that the microprocessor will be reset if respective portions of the program in which the watchdog instructions are located are executed in the wrong sequence or if either or any of such portions is not executed.

In a preferred microprocessor arrangement embodying the invention and described in detail hereinbelow, the supervisory means comprises watchdog instruction decoder means connected to the microprocessor and having a plurality of output lines, the watchdog instruction decoder means being responsive to execution of each watchdog instruction to actuate a respective one of said output lines whereby, if the microprocessor is operating correctly, said output lines will be actuated in a predetermined sequence, and a watchdog circuit connected to said output lines and being responsive to said output lines being activated in other than said predetermined sequence to reset the microprocessor. Such an arrangement provides the advantage that it is simple to determine whether the watchdog instructions are executed other than in the predetermined order in that, if this is the case, the output lines are activated in other than the predetermined sequence. Thus, the watchdog circuit may, for example, comprise logic means operative to apply a reset command to a reset input of the microprocessor if it detects that said output lines are activated other than in said predetermined sequence.

In the preferred microprocessor arrangement, the watchdog circuit comprises a timer circuit operative to apply a reset command to the reset input of the microprocessor when a preset interval of time has elapsed after the timer circuit has been reset, the logic means being connected to the timer circuit to reset the timer circuit each time that a said output line is activated in said predetermined sequence. This feature has the advantage that it can ensure that the watchdog circuit will reset the microprocessor if no watchdog instructions at all are outputted, which will occur if, for example, the microprocessor does not execute the program. Conveniently, the timer circuit comprises a counter having a clock input connected to receive a clock signal, the counter being operative to produce said reset command when it is full.

The logic means of the preferred microprocessor arrangement comprises a recirculating shift register having a number of stages equal to the number of said output lines and loaded with a pattern corresponding to the way in which said output lines should be activated when the first of the watchdog instructions has been executed, a plurality of AND function circuits each having a first input connected to a respective one of said output lines and a second input connected to a respective stage of the shift register, an OR function circuit having a plurality of inputs each connected to an output of a respective one of the AND function circuits, and means for stepping the content of the shift register each time that a watchdog instruction is executed. This form of construction enables the logic means to be implemented in a simple form.

Preferably, the watchdog instructions are located in different levels of the program. For example, at least one watchdog instruction may be located in a main loop of the program and at least one watchdog instruction may be located in a sub-routine that is non-conditionally called for during execution of the main loop. This feature has the advantage that, not only will it assist recognition of non-execution of the sub-routine, but it will assist recognition of a fault in the microprocessor's stack (which holds return addresses for the sub-routines) of such a nature as to cause the program to jump back wrongly from the sub-routine in question to the main loop or into another sub-routine.

The invention also provides a method of supervising the operation of a microprocessor. The method comprises including in a program executed by the microprocessor a number of watchdog instructions which are different from one another and all of which should be executed during execution of the program, and resetting the microprocessor if the watchdog instructions are executed other than in a predetermined order.

BRIEF DESCRIPTION OF THE DRAWINGS

The above and other objects, features and advantages of the invention will be apparent from the following detailed description of illustrative embodiments thereof, which is to be read in conjunction with the accompanying drawings, in which.

DESCRIPTION OF THE PREFERRED EMBODIMENTS

Figure 1:
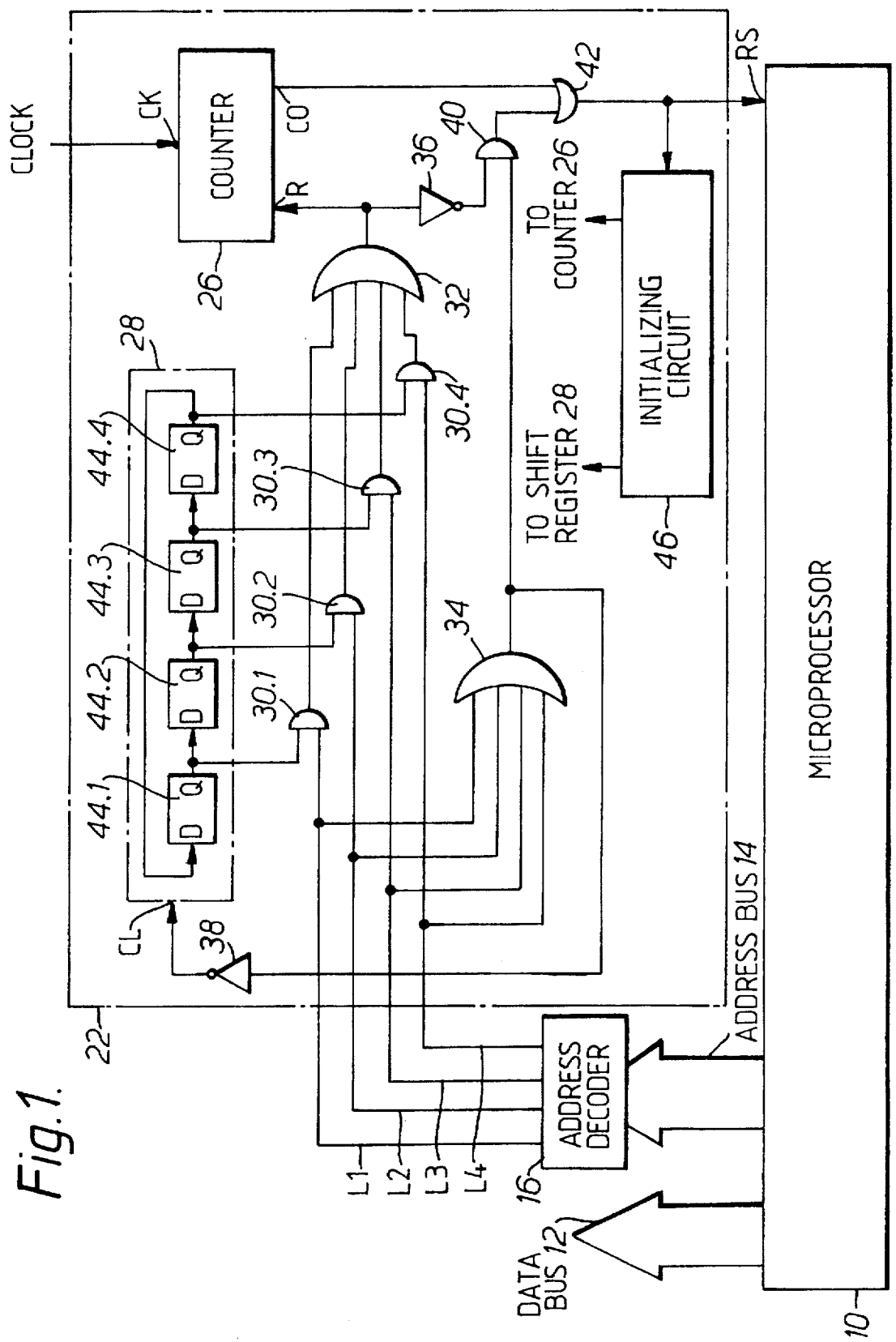
FIG. 1 is a block schematic view of a microprocessor arrangement embodying the invention.

FIG. 1 shows a microprocessor arrangement comprising a microprocessor 10, a data bus 12 and an address bus 14 each connected to the microprocessor 10, an address decoder 16 having an input connected to the address bus 14 and having four address-decoded output lines L1, L2, L3 and L4, and a watchdog circuit 22 connected to the output lines L1 to L4 and to a reset input RS of the microprocessor 10.

The watchdog circuit 22 comprises a counter 26, and a logic means that is constituted by a shift register 28, four two-input AND-gates 30.1, 30.2, 30.3 and 30.4, two four-input OR gates 32 and 34, two inverters 36 and 38, another two-input AND-gate 40, and a two-input OR-gate 42.

It is appropriate to observe at this point that FIG. 1 is drawn for clarity in positive logic form, that is to say according to a convention in which signals are active when at high level (logic level "1"). (This contrasts to the usual convention of representing microprocessor circuits in negative logic (active when low-logic level "0") form.)

The shift register 28 is a four stage shift register that comprises four D-type latches 44.1, 44.2, 44.3 and 44.4, each having a respective input D and a respective output Q, the latches being interconnected in tandem as shown. The shift register 28 is a barrel-type (recirculating) shift register, that is to say its output (the output Q of the latch 44.4) is connected back to its input (the input D of the latch 44.1) whereby a pattern of logic levels or bits initially loaded in the shift register is circulated (stepped) indefinitely around the shift register as the shift register is clocked.

The four inputs of the four-input OR-gate 34 are connected to the output lines L1 to L4, respectively. An output of the OR-gate 34 is connected via the inverter 38 to a clock input CL of the shift register 28. The output of the OR-gate 34 is connected also to one of the inputs of the two-input AND-gate 40.

One input of each of the two-input AND-gates 30.1 to 30.4 is connected to a respective one of the output lines L1 to L4. The other input of each of the gates 30.1 to 30.4 is connected to the output Q of a respective one of the latches 44.1 to 44.4 of the shift register 28.

Outputs of the AND-gates 30.1 to 30.4 are connected to respective ones of the four inputs of the OR-gate 32. An output of the gate 32 is connected to a reset input R of the counter 26 and, via the inverter 36, to the other input of the two-input AND-gate 40.

An output of the AND-gate 40 is connected to one of the inputs of the two-input OR gate 42. The other input of the gate 42 is connected to a carry out output CO of the counter 26. An output of the gate 42 is connected to the reset input RS of the microprocessor 10.

An initializing circuit 46 for the watchdog circuit 22, the function of which initializing circuit is explained below, has an input connected to the reset input RS of the microprocessor 10 and outputs connected to the reset input R of the counter 26 and to the shift register 28.

A clock input CK of the counter 26 is connected to receive a clock signal which may be, or my be derived from, a clock signal generated for use by the microprocessor 10 in a manner known per se.

The microprocessor 10 is arranged to execute a program which is, for example, loaded in a memory device (not shown) connected to or incorporated in the microprocessor. In a manner described more fully below with reference to FIG. 2, the instructions contained in the program include at least two commands or instructions, referred to herein as watchdog instructions, which are different from one another and are located in respective different portions of the program other than any conditionally executed portions (such as IF-THEN loops) that the program might contain. Thus, if the microprocessor is operating correctly, all of the watchdog instructions should be executed and, what is more, the watchdog instructions will be executed in a predetermined order. When the program is executed, data portions of the instructions thereof are sent to the data bus 12 and address portions of the instructions thereof are sent to the address bus 14 (and thus to the address decoder 16). The address decoder 16 identifies whether the addresses it receives via the address bus 14 are or are not watchdog instructions. (Since, in this embodiment, each watchdog instruction needs to apply information to the address bus 14 only, that is it need not apply information to the data bus 12, each watchdog instruction my comprise only an address or address portion.) The address decoder 16 does not, at least as regards its output lines L1 to L4, respond to addresses which result from the execution of instructions other than watchdog instructions. However, when the address decoder 16 detects a watchdog instruction, it activates one of the output lines L1 to L4. The watchdog instructions are different from one another and the address decoder 16 is responsive to each of them to activate a respective one of the output lines L1 to L4. Therefore, if the program is executed correctly, the output lines L1 to L4 will be activated in a predetermined sequence corresponding to the above-mentioned predetermined order of execution of the watchdog instructions.

In the present embodiment, where, for example, four watchdog instructions are included in the program, the address decoder 16 is operative, if the program is being executed correctly whereby the four watchdog instructions are executed in the predetermined order, to activate the output lines L1 to L4 in the sequence L1, L2, L3 and L4. Thus, as the watchdog instructions are executed, binary level patterns following the sequence 1000, 0100, 0010 and 0001 are applied to the output lines L1, L2, L3 and L4.

The manner of operation of the above-described microprocessor arrangement will now be explained.

When the microprocessor 10 is initialized on being powered up, the watchdog circuit 22 also is initialized. Initialization of the watchdog circuit 22 comprises resetting the counter 26, by making its reset input R go active (that is, by applying logic level 1 to the input R), and loading a logic level pattern 1000 into the shift register 28 so that the outputs Q of the latches 44.1, 44.2, 44.3 and 44.4 thereof are at logic levels 1, 0, 0 and 0, respectively. Since the initialization of the microprocessor 10 involves making its reset input RS go active (applying logic level 1 thereto), the initialization of the watchdog circuit 22 may be effected by the above-mentioned initializing circuit 46 which is connected to the reset input RS of the microprocessor 10 and is responsive to level 1 being applied to the reset input RS (to initialize the microprocessor) to initialize the watchdog circuit 22 by performing the operations just explained. Alternatively, however, the initialization of the watchdog circuit 22 could be effected by software rather than by hardware, that is by commands in the program which will cause initialization of the watchdog circuit 22 whenever the microprocessor is reset, in which case the initialization circuit 46 is not needed.

After initialization of the microprocessor 10 and the watchdog circuit 22, the microprocessor starts to execute the program. Prior to execution of the first watchdog instruction, all of the output lines L1 to L4 will be at level 0 (inactive) because the address decoder 16 does not respond to the information on the address bus 14 resulting from instructions other than watchdog instructions. The outputs of the latches 44.1, 44.2, 44.3 and 44.4 of the shift register 28 are at levels 1, 0, 0 and 0, respectively. Therefore, the outputs of all of the AND-gates 30.1 to 30.4 are at level 0, so that the output of the OR-gate 32 also is at level 0. Thus, the reset input R of the counter 26 is at level 0 whereby the counter is not reset. So, the counter 26 counts pulses of the clock signal, as applied to its clock input CK, starting from zero when the counter was reset on initialization.

When the microprocessor 10 executes the first watchdog instruction, it activates (as it does for other instructions) the data bus 12 and the address bus 14. In the case of a watchdog instruction, the data bus 12 serves no function. However, the address bus 14 directs the watchdog instruction (an address) to the address decoder 16, which decodes the instruction and activates the output line L1. Thus, the lines L1, L2, L3 and L4 are at levels 1, 0, 0 and 0, respectively. (That is, the pattern of levels on the lines L1, L2, L3 and L4 changes from 0000 to 1000.) Therefore, the output of the four-input OR-gate 34 (which was previously at level 0) goes to level 1 whereby level 1 is applied to the one input of the AND-gate 40 (which was previously at level 0). Also, the outputs of the latches 44.1, 44.2, 44.3 and 44.4 of the shift register 28 being still at levels 1, 0, 0 and 0, respectively, the outputs of the AND-gates 30.1 to 30.4 go to levels 1, 0, 0 and 0, respectively (since both inputs of the gate 30.1 are at level 1, whereas the two inputs of each of the gates 30.2 to 30.4 are at level 0). Consequently, the output of the OR-gate 32 goes active (goes to level 1) and the counter 26 is reset to zero. Further, the level 1 at the output of the OR-gate 32 is inverted by the inverter 36 so that level 0 is applied to the other input of the AND-gate 40 (which was previously at level 1). The output of the AND-gate 40, which is connected to the one input of the OR-gate 42, therefore remains at level 0. Consequently, since the carry out output CO of the counter 26 remains at level 0 because the counter has not been filled up by the clock signal, the level applied from the output of the OR-gate 42 to the reset input RS of the microprocessor 10 remains at 0 whereby the microprocessor is not reset.

After a few microprocessor clock cycles, the microprocessor 10 deactivates the data bus 12 and address bus 14 prior to executing the next instruction in the program. When, as a consequence, the watchdog instruction is no longer applied to the address decoder 16, the address decoder is responsive to the termination of the application thereto of a valid watchdog instruction to cause the line L1 to become inactive again. Thus, the lines L1 to L4 are all at level 0 again. Also, the change in level of the output of the OR-gate 34 from level 1 back to level 0, as inverted by the inverter 38 so that a positive-going edge is applied to the clock input CL of the shift register 28, causes clocking of the shift register 28 whereby the contents of the shift register are stepped. Thus, the outputs of the latches 44.1, 44.2, 44.3 and 44.4 of the shift register 28 become of levels 0, 1, 0 and 0, respectively. Therefore, since the lines L1 to L4 are all at level 0 again, the four inputs of the OR-gate 32 all revert to level 0, the output of the gate 32 also reverts to zero, and the counter 26 again starts to count up from zero.

When the microprocessor 10 executes the second watchdog instruction and outputs it to the address bus 14, the address decoder 16 is responsive thereto to activate the line L2. Thus, the lines L1, L2, L3 and L4 in this case are at levels 0, 1, 0 and 0, respectively. (That is, the pattern of levels on the lines L1, L2, L3 and L4 changes from 0000 to 0100). Therefore, the output of the OR-gate 34 (which was previously at level 0) again goes to level 1 whereby level 1 is applied to the one input of the AND-gate 40 (which was previously at level 0). Also, the outputs of the latches 44.1, 44.2, 44.3 and 44.4 of the shift register 28 being at levels 0, 1, 0 and 0, respectively, the outputs of the AND-gates 30.1 to 30.4 go to levels 0, 1, 0 and 0, respectively. Consequently, as when the first watchdog instruction was executed, the output of the OR-gate 32 goes active (goes to level 1) and the counter 26 is reset to zero. Further, the level 1 at the output of the OR-gate 32 is inverted by the inverter 36 so that level 0 is applied to the other input of the AND-gate 40 (which was previously at level 1). The output of the AND-gate 40, which is connected to the one input of the OR-gate 42, therefore remains at level 0. Consequently, since the carry out output CO of the counter 26 remains at level 0 because the counter has not been filled up by the clock signal, the level applied from the output of the OR-gate 42 to the reset input RS of the microprocessor 10 remains at 0 whereby the microprocessor is not reset.

Once more, after a few microprocessor clock pulses, the microprocessor 10 deactivates the data bus 12 and the address bus 14 and the address decoder 16 is responsive to the consequent termination of the application thereto of a valid watchdog instruction to cause the line L2 to go inactive again. Thus, the lines L1 to L4 are again all at level 0. Also, the change in level of the output of the OR-gate 34 from level 1 back to level 0, as inverted by the inverter 38 so that a positive-going edge is applied to the clock input CL of the shift register 28, causes clocking of the shift register 28 whereby the contents of the shift register are again stepped. Thus, in this case, the outputs of the latches 44.1, 44.2, 44.3 and 44.4 of the shift register 28 become of levels 0, 0, 1 and 0, respectively. Therefore, since the lines L1 to L4 are all at level 0 again, the four inputs of the OR-gate 32 all revert to level 0, the output of the gate 32 also reverts to zero, and the counter 26 again starts to count up from zero.

In similar manner, when the third watchdog instruction is executed, the line L3 goes active, the outputs of the AND-gates 30.1 to 30.4 are at levels 0, 0, 1 and 0, respectively, the counter 26 is again reset and the shift register 28 is again stepped to output the pattern 0001. Likewise, when the fourth watchdog instruction is executed, the line L4 goes active, the outputs of the AND-gates 30.1 to 30.4 are at levels 0, 0, 0 and 1, respectively, and the counter 26 is again reset. Also, assuming that the program is repetitively executed, the shift register 28 is again stepped to output the pattern 1000 ready for the next arrival of the first watchdog instruction on the next execution (program loop) of the program. The process thus continues indefinitely, with the counter 26 being reset each time that a watchdog instruction is executed, provided that the watchdog instructions are executed in the proper sequence whereby the pattern of activation of the lines L1 to L4 brought about upon each watchdog instruction execution matches the pattern being outputted by the shift register 28.

Suppose, however, that, due to a fault, the watchdog instructions are not executed in the correct order. More specifically, suppose that one of the watchdog instructions (say the first one) is skipped so that the second watchdog instruction (which produces the pattern 0100 on the lines L1 to L4) is executed when the shift register is outputting the pattern 1000 for the first watchdog instruction. In this case, as for the case in which the next watchdog instruction executed is that which should in fact follow in the predetermined order, the output of the OR-gate 34 will still go to level 1. However, unlike the case in which the correct order of execution is maintained, the mismatch between the bit pattern on the lines L1 to L4 and the pattern outputted by the shift register will result in none of the AND-gates 30.1 to 30.4 having both of its inputs at level 1. Consequently, the output of the OR-gate 32 will remain at level 0 whereby the output of the inverter will remain at level 1. Thus, both inputs of the AND-gate 40 will be at level 1 (active) whereby the output of the gate 40 will go to level 1 and this level will be passed to the reset input RS of the microprocessor 10, via the OR-gate 42, so as to reset the microprocessor. Thus, the address decoder 16 and the watchdog circuit 22 cooperate to act as supervisory means responsive to the watchdog instructions being executed other than in the above-mentioned predetermined order to reset the microprocessor 10 at once.

Suppose now that a fault resulting in non-execution of the program arises, whereby, rather than the watchdog instructions being executed in an order other than the predetermined order, they are not executed at all. The logic means of the watchdog circuit 22 will not in this event immediately reset the microprocessor 10 in the manner described above, that is via the AND-gate 40, since it cannot distinguish between all of the lines L1 to L4 being at level 0 (inactive) as a result of failure to execute the program and all of the lines L1 to L4 being at level 0 (inactive) in the intervals between execution of the watchdog instructions during normal (correct) operation. Nonetheless, the watchdog circuit 22 will reset the microprocessor 10 in this case also. In this regard, the capacity of the counter 26 and the speed of the clock signal applied to the clock input CK thereof are chosen so that, provided the counter is not previously reset, the counter will fill up, and generate a level 1 on its carry out output CO, after the elapsing of a predetermined interval of time which is greater than the greatest interval between the execution of consecutive watchdog instructions: the counter thus acts as a timer circuit. Thus, in normal operation, the counter 26 will always be reset as described above, namely each time that a watchdog instruction is executed, before it fills up. However, in the event of a fault resulting in non-execution of the program, the counter 26 will not be reset. Therefore, shortly after execution stops the counter 26 will fill up and its carry out output CO will go to level 1, that is become active, and transmit the level 1, via the OR-gate 42, to the reset input RS of the microprocessor 10 whereby the microprocessor will be reset.

Thus, to summarize, the watchdog circuit 22 will reset the microprocessor 10 if the watchdog instructions are executed in other than the predetermined order or if the watchdog instructions are not executed at all.

Figure 2:
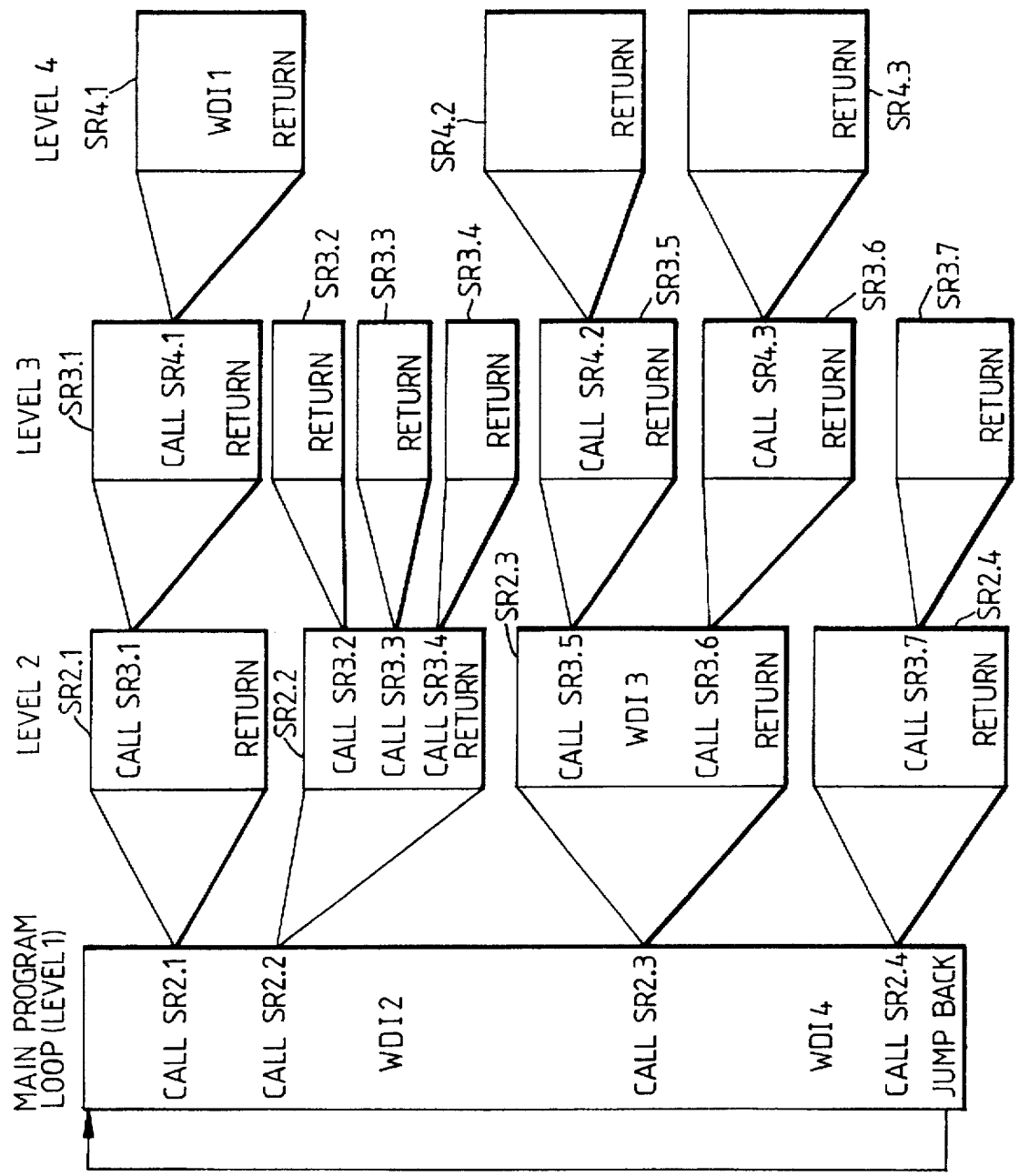
FIG. 2 is a flow diagram of a program executed by a microprocessor of the arrangement of FIG. 1.

FIG. 2 is a flow diagram showing an example of a program that might be executed by the microprocessor 10. The program illustrated in FIG. 2 comprises a plurality of program levels. Specifically, there are, for example, four levels designated as Levels 1 to 4. Level 1 is a main program loop that is repetitively executed, the loop jumping back to its beginning when it reaches its end. Levels 2 to 4 comprise sub-routines that are called for during execution of the main program loop. More specifically, Level 2 comprises sub-routines SR2.1 to SR2.4 that are called for directly by call instructions in the main program loop, Level 3 comprises sub-routines SR3.1 to SR3.7 that are called for by call instructions in the sub-routines of Level 2, and Level 4 comprises sub-routines SR4.1 to SR4.3 that are called for by call instructions in the sub-routines of Level 3.

The first to fourth watchdog instructions, designated WDI1 to WDI4 in FIG. 2, are located in different ones of Levels 1 to 4. (Specifically, by way of example, the watchdog instructions WDI2 and WDI4 are located in Level 1 (the main program loop), the watchdog instruction WDI1 is located in the sub-routine SR4.1 of Level 4, and the watchdog instruction WDI3 is located in the sub-routine SR2.3 of Level 2). This feature has the advantage that, not only will it assist recognition of non-execution of the sub-routine, but it will assist recognition of a fault in the microprocessor's stack (which holds return addresses for the sub-routines) of such a nature as to cause the program to jump back wrongly from the sub-routine in question to the main program loop (Level 1) or into another sub-routine.

The watchdog instructions WDI1 to WDI4 are preferably so located in the program that the intervals between their execution are at least approximately equal. The interval between every watchdog instruction and the one that follows it (in the same loop or the next loop) is, of course, less than the predetermined time taken by the counter 26 to fill up.

The invention can, of course, be carried into effect in other ways than that described above by way of example. For instance, although there are four watchdog instructions in the above-described embodiment, the number of watchdog instructions can be any plural number. Further, the timer circuit need not necessarily be a counter. It might, for example, be a retriggerable monostable circuit ("one shot"), in which case the clock signal would not be needed. Also, although in the above example the logic means comprises OR-gates and AND-gates, it will be appreciated that, with logical inversion, NOR-gates and NAND-gates could instead be used. That is to say, the logic means may, speaking more generally, use OR function circuits (OR-gates or NOR-gates) and AND function circuits (AND-gates or NAND-gates).

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A microprocessor apparatus comprising:
   microprocessor means for executing a predetermined program which includes a plurality of watchdog instructions which are different from one another and all of which would be executed during complete execution of said program wherein a first watchdog instruction is located in a main loop of said program and a second watchdog instruction is located in a sub-routine that is non-conditionally called for during execution of said main loop;
   watchdog instruction decoder means connected to an output of said microprocessor means for decoding a signal supplied at said output in response to execution of each watchdog instruction including each of the first and second watchdog instructions to provide a respective one of a plurality of activation signals on one of a plurality of output lines thereof such that, if said microprocessor means is operating correctly, said output lines will be provided with said activation signals in a predetermined sequence; and watchdog circuit means connected to said output lines for resetting said microprocessor means in response to an occurrence of said activation signals on said output lines in other than said predetermined sequence.

2. A microprocessor apparatus according to claim 1, wherein said watchdog circuit means comprises logic means for applying a reset command to a reset input of said microprocessor means in response to the occurrence of said activation signals on said plurality of output lines other than in said predetermined sequence.

3. A microprocessor apparatus according to claim 2, wherein said watchdog circuit means comprises a resettable timer circuit operative to apply a reset command to said reset input of said microprocessor when a preset interval of time has elapsed after said timer circuit has been reset, said logic means being connected to said timer circuit to reset said timer circuit each time that said respective one of said plurality of activation signals is provided on said one of a plurality of output lines in response to execution of each watchdog instruction in said predetermined sequence.

4. A microprocessor apparatus according to claim 3, wherein said timer circuit comprises counter means for counting a clock signal, said counter means having a predetermined count capacity and being operative to produce said reset command when it is full.

5. A microprocessor apparatus according to claim 2, wherein said logic means comprises:

recirculating shift register means having a plurality of shift register stages for storing respective signals;

means for initially loading a signal having at least one bit equal to a bit of a first one of said activation signals in at least one of said shift register stages;

a plurality of AND function means for producing a predetermined logic signal at an output thereof upon the provision of a predetermined logic signal at each of a respective one of said output lines and a respective stage of said shift register;

OR function means for producing a predetermined logic signal at an output thereof upon receipt of a predetermined logic signal at one of a plurality of inputs thereof each connected to the output of a respective one of said AND function means; and means for stepping the signals stored in said plurality of shift register stages to succeeding ones thereof each time that a watchdog instruction is executed.

6. A microprocessor apparatus according to claim 1, wherein said signal supplied at said output of said microprocessor means comprises a predetermined address and said watchdog instruction decoder means comprises address decoder means connected to said output of said microprocessor means by an address bus for decoding said predetermined address upon the execution of a corresponding watchdog instruction to provide said respective one of said plurality of activation signals.

7. A method of supervising the operation of a microprocessor, said method comprising the steps of:

including in a program executed by said microprocessor a plurality of watchdog instructions which are different from one another and all of which would be executed during complete execution of said program, wherein said program includes a first watchdog instruction in a main loop of said program and a second watchdog instruction in a sub-routine that is non-conditionally called for during execution of said main loop;

initiating execution of said program by said microprocessor;

decoding an output of said microprocessor to produce a respective one of a plurality of activation signals at a corresponding one of a plurality of signal terminals on execution of a respective watchdog instruction such that, if said microprocessor is operating correctly according to said program, said activation signals will be provided at respective ones of said plurality of signal terminals in a predetermined sequence; and resetting said microprocessor if said activation signals are provided at said plurality of signal terminals other than in said predetermined sequence.

8. A method according to claim 7, wherein the step of resetting said microprocessor comprises resetting said microprocessor upon the expiration of a preset interval of time after a resettable timer circuit has last been reset, said method further comprising the step of resetting said resettable timer circuit each time that one of said activation signals is provided in said predetermined sequence.

9. A method according to claim 7, which further comprises loading a plurality of stages of a recirculating shift register with respective signals forming a signal pattern corresponding to a pattern of signals provided at said plurality of signal terminals when a first one of said watchdog instructions has been executed, establishing whether said plurality of activation signals has been provided in said predetermined sequence by comparing the signals provided at said signal terminals with the signals stored in respective stages of said shift register, and stepping the signals stored in the stages of said shift register to successive stages thereof each time that a watchdog instruction is executed.

10. A method according to claim 7, wherein the step of decoding an output of said microprocessor comprises decoding a predetermined address produced by said microprocessor means upon the execution of said respective watchdog instruction to produce said respective one of said plurality of activation signals.

* * * * *